United States Patent
Glezerman et al.

(10) Patent No.: US 8,391,792 B2
(45) Date of Patent: Mar. 5, 2013

(54) SYSTEM AND METHOD FOR INITIATING AD-HOC COMMUNICATION BETWEEN MOBILE HEADSETS

(75) Inventors: Abraham Glezerman, Tel-Aviv (IL); Yossef Twina, Rosh-Ha'ayin (IL)

(73) Assignee: Cardo Systems, Inc., Pittsburgh, PA (US)

( * ) Notice: Subject to any disclaimer, the term of this patent is extended or adjusted under 35 U.S.C. 154(b) by 21 days.

(21) Appl. No.: 13/020,648

(22) Filed: Feb. 3, 2011

(65) Prior Publication Data
US 2012/0202425 A1    Aug. 9, 2012

(51) Int. Cl.
    *H04B 7/00*    (2006.01)
(52) U.S. Cl. .................. 455/41.2; 455/575.2
(58) Field of Classification Search .......... 455/41.2, 455/41.3, 575.2
    See application file for complete search history.

(56) References Cited

U.S. PATENT DOCUMENTS
2009/0305632 A1* 12/2009 Sarkissian et al. ......... 455/41.2
2009/0325491 A1* 12/2009 Bell et al. .................. 455/41.3
2010/0245585 A1*  9/2010 Fisher et al. ............... 348/164

* cited by examiner

Primary Examiner — Lewis West
(74) Attorney, Agent, or Firm — Leason Ellis LLP

(57) ABSTRACT

A system and method are provided for a system and method for initiating ad-hoc communication between mobile headsets. A communication device is provided, including a processor and a control circuit which is connected to the processor and which has a paired-communication module that configures the processor to provide paired communication with at least one additional device. The control circuit further includes an ad-hoc communication module that configures the processor to establish and maintain an ad-hoc communication session with a second communication device that is not presently paired with the first communication device. The referenced communication session is enabled by acquiring an open communication channel. Additionally, a method for providing an ad-hoc communication session with at least one communication device is provided. The method begins by identifying a second communication device within communication range of a first communication device and which is not presently paired to the first communication device. The method continues by requesting a communication channel through which the first communication device and the second communication device can communicate, and pairing the first communication device and the second communication device. Then, an acceptance from the second communication device to join the ad-hoc communication session is received. Upon receiving the acceptance, the communication channel for communication between the first communication device and the second communication device is opened. Upon termination of the ad-hoc communication session, the first communication device and the second communication device are disconnected.

17 Claims, 3 Drawing Sheets

SYSTEM AND METHOD FOR INITIATING AD-HOC COMMUNICATION BETWEEN MOBILE HEADSETS

TECHNICAL FIELD OF THE INVENTION

This disclosure relates generally to the field of mobile communication devices and, in particular, to systems and methods for mobile communication between headsets.

BACKGROUND OF THE INVENTION

With the proliferation of mobile communication technologies, in particular cellular phones, individuals have become accustomed to communicating with one another in situations and settings where communication was previously impossible. For instance, it is now common for individuals to conduct telephone conversations while traveling, and even while personally operating motor vehicles such as cars and motorcycles. However, in the interests of safety, in addition to the dictates of various local and state laws and regulations, most individuals who conduct telephone conversations while driving do so using various headsets. These headsets generally attach in various ways to the user's head/ear, and maintain a connection with the user's mobile phone. The headset enables the user to conduct a telephone conversation while driving without the need to hold or operate the user's mobile phone. While various communications protocols and methods can be used to connect a headset with a mobile phone, the most common is the Bluetooth wireless technology standard.

While the Bluetooth standard has been applied effectively in connecting mobile headsets with cellular phones, various other capabilities have not been fully explored. For instance, using Bluetooth, two mobile headsets within range of one another can communicate in an intercom-like fashion, without the use of cellular phones. However, in order to accomplish such communication using currently available Bluetooth headsets, the headsets must be paired specifically with one another, a manual process that can take more than 60 seconds before the users may actually begin communication. In addition to the inconvenient time delay, the manual pairing of the devices, which requires significant input and coordination by the respective users, is difficult, if not impossible to achieve in settings where the users themselves are driving. Thus, Bluetooth mobile headset users do not presently have the ability to effectively utilize this capacity to communicate with other headset users that are within communication range.

It is with respect to these and other considerations that the disclosure made herein is presented.

SUMMARY OF THE INVENTION

Technologies are presented herein for a system and method for initiating ad-hoc communication between mobile headsets. According to one aspect, a communication device is provided, including a processor and a control circuit which is connected to the processor and which has a paired-communication module that configures the processor to provide paired communication with at least one additional device. The control circuit further includes an ad-hoc communication module that configures the processor to establish and maintain an ad-hoc communication session with a second communication device that is not presently paired with the first communication device. Additionally, the control circuit includes a transmitter connected to the control circuit for transmitting communication signals to the second communication device in support of an ad-hoc communication session, and a receiver connected to the control circuit for receiving communication signals from the second communication device concerning the ad-hoc communication session. A microphone and speaker are also connected to the control circuit. The referenced communication session is enabled by acquiring an open communication channel.

According to another aspect, a method for providing an ad-hoc communication session with at least one communication device is provided. The method begins by identifying a second communication device within communication range of a first communication device and which is not presently paired to the first communication device. The method continues by requesting a communication channel through which the first communication device and the second communication device can communicate, and pairing the first communication device and the second communication device. Then, an acceptance from the second communication device to join the ad-hoc communication session is received. Upon receiving the acceptance, the communication channel for communication between the first communication device and the second communication device is opened. Upon termination of the ad-hoc communication session, the first communication device and the second communication device are disconnected.

According to yet another aspect, a method for participating in an ad-hoc communication session with at least one communication device is provided. The method begins by receiving at a second communication device a communication signal from a first communication device requesting that the second communication device join an ad-hoc communication session with the first communication device, and notifying a user of the communication signal. The method continues by receiving an acceptance from the second communication device to join the ad-hoc communication session and then pairing the first communication device and the second communication device. Then, a communication channel for communication between the first communication device and the second communication device is opened. Upon termination of the ad-hoc communication session, the first communication device and the second communication device are disconnected.

These and other aspects, features, and advantages can be appreciated from the accompanying description of certain embodiments of the invention.

DETAILED DESCRIPTION OF CERTAIN EMBODIMENTS OF THE INVENTION

The following detailed description is directed to systems and methods for initiating ad-hoc communication between mobile headsets. References are made to the accompanying drawings that form a part hereof, and which are shown by way of illustration through specific embodiments, arrangements, and examples.

Figure 1:
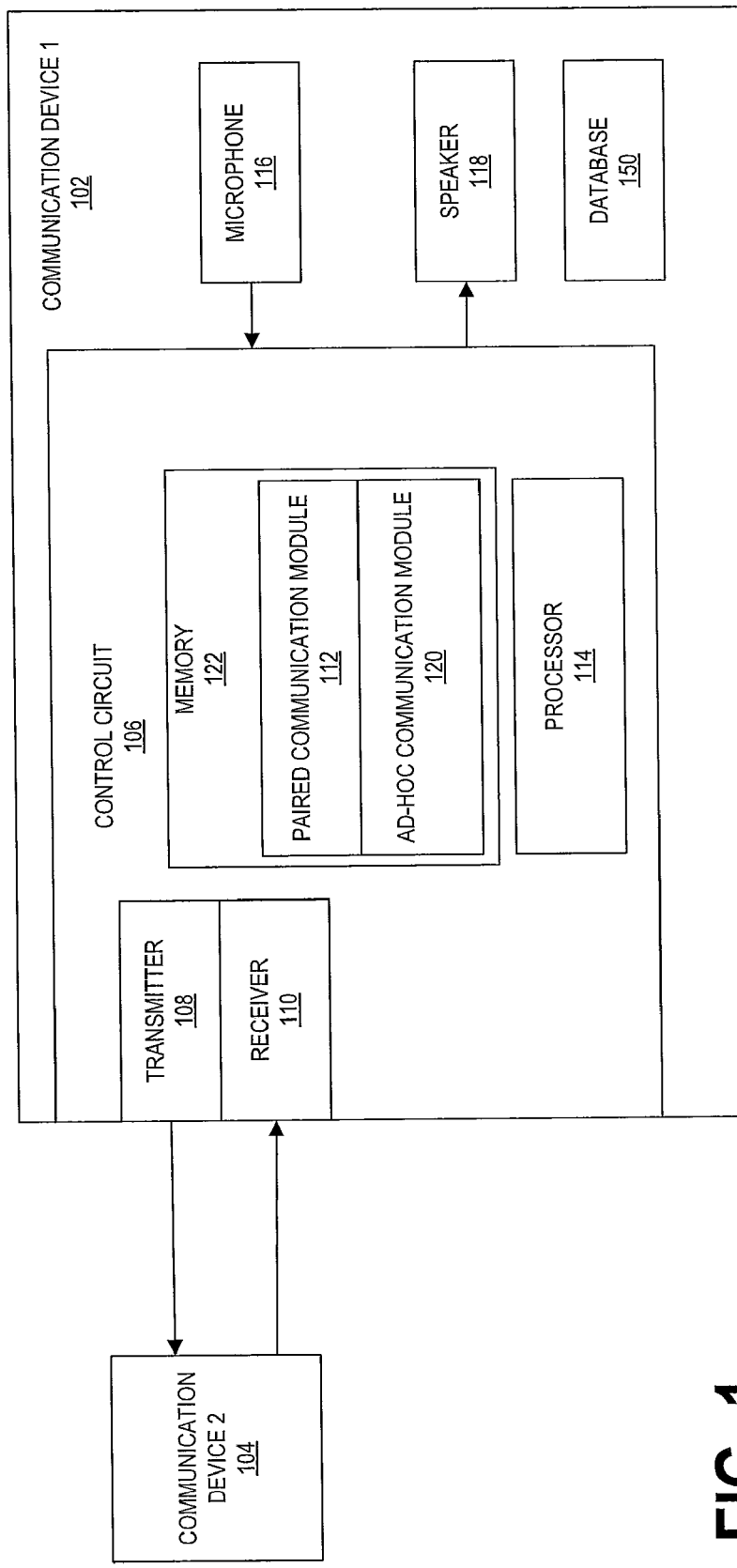
FIG. 1 is a high-level diagram of a communication device in accordance with one exemplary embodiment.

Referring now to the drawings, it is to be understood that like numerals represent like elements through the several figures, and that not all components and/or steps described and illustrated with reference to the figures are required for all embodiments or arrangements. FIG. 1 is a high-level diagram illustrating an exemplary configuration of communication device 102 (a first communication device), which is preferably a Bluetooth communication headset, although other communication headsets using other communication protocols and methods could be similarly substituted. Communication device 102 is often paired with a mobile communication device, such as a cellular phone (not shown), though such pairing is unnecessary and extraneous in context of the present disclosure. The communication device 102 includes a control circuit 106 which is operatively connected to various hardware and software components that serve to enable ad-hoc communication between mobile headsets.

Control circuit 106 includes a paired communication module 112 that is stored in memory 122 on the control circuit 106. In an alternate arrangement, the paired communication module 112 can be stored on practically any storage medium (such as a hard disk drive, flash memory, etc.) that is operatively connected to the control circuit 106. The paired communication module 112 can comprise a software program or set of instructions executed in processor 114. During execution, the paired communication module 112 configures the processor 114 to provide paired communication with at least one additional device, such as communication device 104, as will be described in greater detail below. It should be noted that while pairing can be accomplished through conventional Bluetooth protocols, the method of initiating and achieving the pairing is as described herein. Additionally, while FIG. 1 does not fully illustrate the structure of communication device 104 to the degree of detail provided for communication device 102, it should be understood that communication device 104 can have a substantially identical structure and function to that of communication device 102 (as depicted in FIG. 1). In most arrangements, it is expected that communication device 102 and communication device 104 will be substantially similar devices (that is, preferably Bluetooth communication headsets).

Control circuit 106 also includes an ad-hoc communication module 120 that is stored in memory 122 on the control circuit 106. In an alternate arrangement, the ad-hoc communication module 120 can be stored on practically any storage medium (such as a hard disk drive, flash memory, etc.) that is operatively connected to the control circuit 106. The ad-hoc communication module 120 can comprise a software program or set of instructions executed in processor 114 or can comprise hardware components or a combination of hardware and software. During execution/operation, the ad-hoc communication module 120 configures the processor 114 to establish and maintain an ad-hoc communication session with a second communication device, such as communication device 104 (a second communication device), as will be described in greater detail below.

Also connected to the control circuit 106 are transmitter 108 and receiver 110. Transmitter 108 is preferably any device capable of transmitting communication signals, such as Bluetooth communication signals. Upon receiving instructions from the control circuit 106, the transmitter 108 can transmit communication signals to practically any other device. In one arrangement, the transmitter 108 transmits communication signals to a second communication device 104 in order to initiate and/or maintain an ad-hoc communication session.

Receiver 110 is preferably any device capable of receiving communication signals, such as Bluetooth communication signals. In one arrangement, the receiver is constantly activated in order to receive any incoming communication signals. In other arrangements, the receiver may be periodically deactivated in response to instructions from the control circuit 106 in order to lower the communication device's 102 power consumption. It should be noted that while transmitter 108 and receiver 110 are depicted as separate elements, in alternate arrangements their functionality can be combined in a single transceiver which operates as both a transmitter and receiver, as is known to those of skill in the art.

It should also be noted that the transmitter 108 and the receiver 110 can be of conventional construction.

Also connected to control circuit 106 are microphone 116 and speaker 118. Microphone 116 receives audible tones from the area immediately surrounding the communication device 102. Preferably, the microphone 116 is configured to receive the spoken voice of the user of the communication device 102. The audible tones received by the microphone are transduced into a signal and transmitted to control circuit 106 where they are, in turn, transmitted as communication signals by transmitter 108 to an external device such as communication device 104.

Speaker 118 is any device capable of transducing communication signals received from or originated at the device 102 and projecting audio tones. In one arrangement, speaker 118 is configured as one or more earbuds or earmuffs which are constructed to rest within or directly upon a user's ear. In an alternate arrangement, speaker 118 can be a loudspeaker for projecting tones in an enclosed area, for use like a speakerphone. The speaker 118 receives analog communication signals from control circuit 106 and conveys them as audible tones to the user. The referenced tones can originate at the control circuit (such as notification sounds relating to various system notifications) and/or at a second communication device 104 (such as during a conversation), as will be described in greater detail below.

Figure 2A:
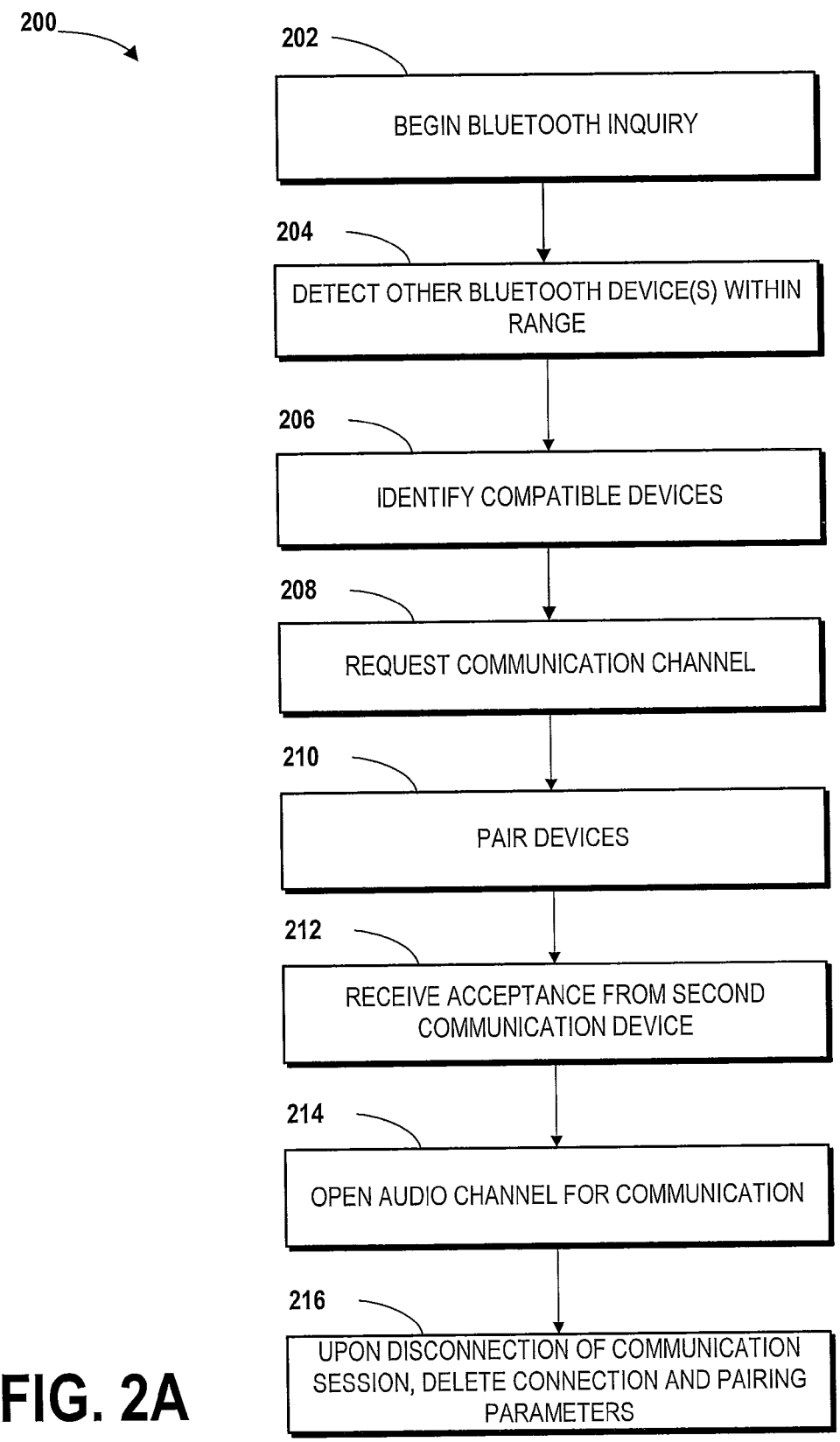
FIG. 2A is a flow diagram illustrating a method for providing an ad-hoc communication session in accordance with one exemplary embodiment.

Turning now to FIG. 2A, a flow diagram is described showing a routine 200 that illustrates a broad aspect of a method for providing an ad-hoc communication session between mobile headsets in accordance with at least one embodiment disclosed herein. It should be appreciated that several of the logical operations described herein are implemented (1) as a sequence of computer implemented acts or program modules running on communication device 102 and/or (2) as interconnected machine logic circuits or circuit modules within the communication device 102. The implementation is a matter of choice dependent on the requirements of the device (e.g., size, energy, consumption, performance, etc.). Accordingly, the logical operations described herein are referred to variously as operations, structural devices, acts, or modules. Various of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The process begins at step 202 where communication device 102 begins inquiring for other communication devices within the communication device's 102 range. For instance, control circuit 106 instructs transmitter 108 to transmit inquiry signals while receiver 110 receives acknowledgement/response signals transmitted by other communication devices. In one arrangement, the Bluetooth wireless protocol is utilized for this inquiry, though other communication protocols and methods can be similarly applied. In another arrangement, communication device 102 can utilize methods other than the transmission of inquiry signals in order to facilitate the various steps described below. Then, at step 204, control circuit 106 detects other communication devices (such as Bluetooth headsets) within communication range using transmitter 108 and receiver 110 as described above. At step 206, the control circuit 106 identifies one or more detected devices that are within communication range of the communication device 102 and which are not presently paired to communication device 102. In one arrangement, control circuit 106 can utilize transmitter 108 and receiver 110 to request the BD Address (providing a unique identifier) and/or the Class of Device record (providing information regarding the type of device) of any/all detected Bluetooth devices. Using this information, the control circuit 106 can identify specific devices that are (or are not) capable of engaging in an ad-hoc communication session with communication device 102. By way of example, control circuit 106 can be operatively connected to a database 150 which contains identifying information (such as BD Addresses and Class of Device records) relating to all devices capable of engaging in an ad-hoc communication session with communication device 102. In one arrangement, the identifying information contained in database 150 can be updated (for example, by connecting communication device 102 to another device having a network connection or having updated identifying information) to reflect the identifying information of newly released devices. In another arrangement, a key generating scheme may be used to generate identifying information for compatible devices, and processor 114 can utilize a decoder to decode a received key and determine the compatibility of a given device. By comparing the received BD Address(es) and/or the Class of Device record(s) of any/all detected Bluetooth devices, the control circuit can quickly determine if a particular device is or is not capable of engaging in an ad-hoc communication session with communication device 102.

It should be noted that in the event of multiple devices being in range which are capable of engaging in an ad-hoc communication session with communication device 102, various approaches are possible. In one arrangement, the control circuit 106 can select a single device at random for ad-hoc communication. In another arrangement, control circuit 106 can select the device which has the greatest signal strength. In yet another arrangement, the control circuit can enable the user to select which among the various compatible devices within range with which the user wishes to engage in an ad-hoc communication session. For example, the control circuit 106 may project through speaker 118 a list of compatible devices within range, and allow the user to select one. Alternatively, the control circuit 106 can present the user with a list of such devices, such as through a visual display (not shown) that is in communication with the control circuit 106. The user can then select the device that he/she wishes to communicate with using any number of input methods such as button pressing, voice commands, etc.

Upon identifying a compatible device, at step 208 the control circuit 106 requests a communication channel that can be acquired and through which the ad-hoc communication session can be conducted. In one arrangement, a specific channel number can be designated for ad-hoc communication using the Bluetooth RFCOMM (radio frequency communication) transport protocol, and the control circuit 106, using transmitter 108 and receiver 110, can request this channel number from an identified compatible device (such as communication device 104) using the Bluetooth Service Discovery Protocol (SDP). Then, at step 210, the communication devices 102, 104 are paired, the pairing process having been initiated by the channel request in step 208.

Once the pairing and the SDP discovery between the communication devices 102, 104 are successful, the first communication device 102, using its control circuit 106 and the RFCOMM transport protocol, requests that the second communication device 104 join the ad-hoc communication session. At step 212, the first communication device 102 receives an acceptance signal from second communication device 104, indicating that the second communication device 104 agrees to join the ad-hoc communication session. Then, at step 214, the control circuit 106 opens the specified communication channel, such as an audio channel, for communication between the first communication device and the second communication device. In one arrangement, the audio channel can operate as a Bluetooth Synchronous Connection Oriented (SCO) link. At this point, the ad-hoc communication session commences, and the users operating the respective communication devices 102, 104 can communicate with one another so long as the Bluetooth connection between their devices remains intact.

At step 216, upon disconnection of the communication session (such as by one party hanging up or traveling out of range), the communication devices 102, 104 are disconnected from one another, and all connection and pairing parameters relating to the ad-hoc communication session are deleted from the respective communication devices 102, 104. In doing so, the respective devices can engage in ad-hoc communication sessions with other communication devices. In another arrangement, any/all of the connection and pairing parameters relating to the ad-hoc communication session are not deleted, and they are maintained by one or both of the communication devices 102, 104 in order to facilitate future ad-hoc communication sessions.

Figure 2B:
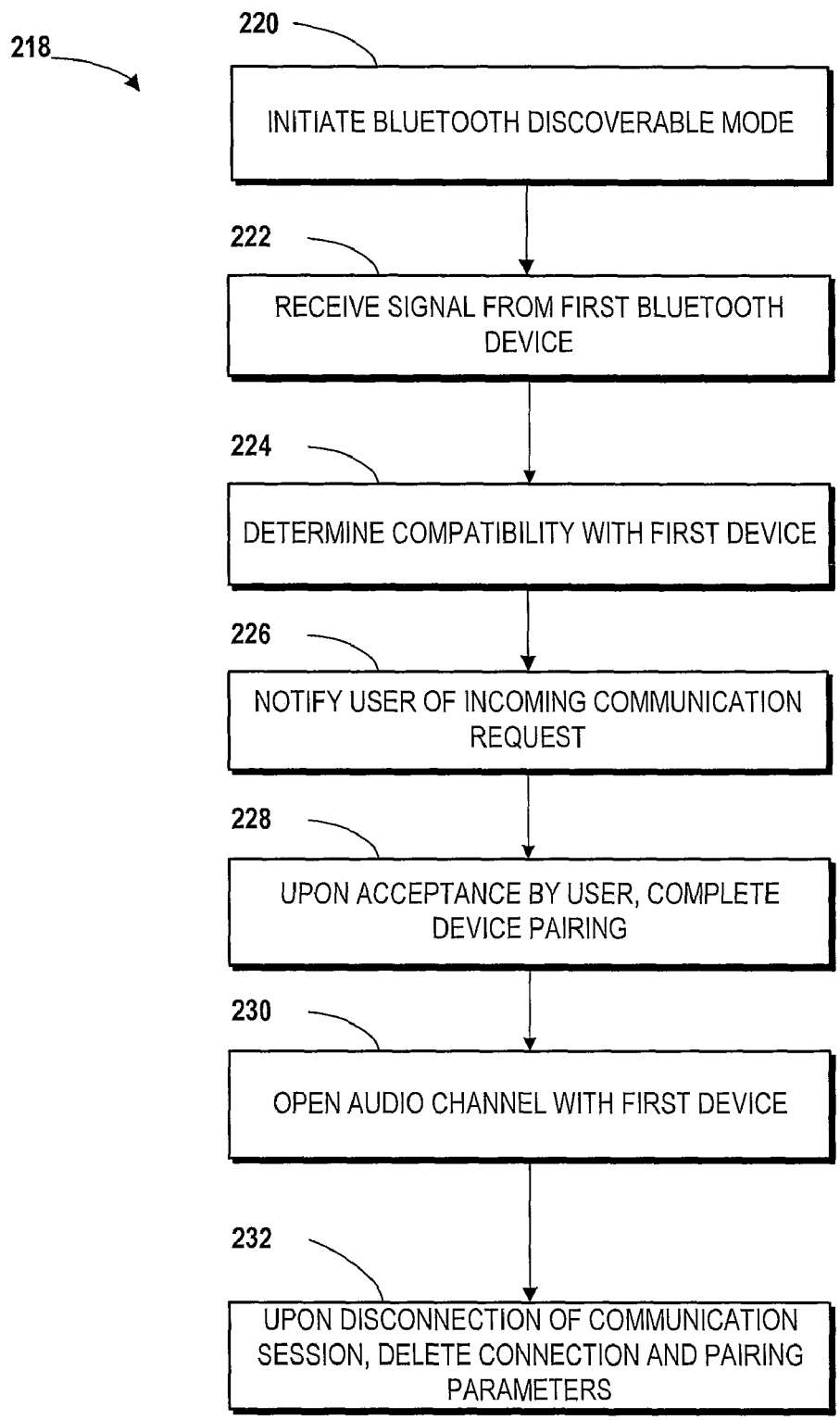
FIG. 2B is a flow diagram illustrating a method for participating in ad-hoc communication session in accordance with one exemplary embodiment.

Turning now to FIG. 2B, a flow diagram is described showing a routine 218 that illustrates a broad aspect of a method for participating an ad-hoc communication session between mobile headsets in accordance with at least one embodiment disclosed herein. It should be noted that although not explicitly depicted in FIG. 1, communication device 104 has a substantially similar structure and operation to that of communication device 102 as depicted in FIG. 1.

The process begins at step 220, where the control circuit of communication device 104 initiates a discoverable mode such as Bluetooth discoverable mode. In doing so, communication device 104 transmits a discovery signal which enables other devices to discover it. At step 222, communication device 104 receives a communication signal from communication device 102 requesting that communication device 104 join it in an ad-hoc communication session. Then, at step 224, the control circuit of communication device 104 determines the compatibility of communication device 104 with communication device 102 with respect to engaging in an ad-hoc communication session. In one arrangement, the control circuit of communication device 104 can utilize its transmitter and receiver to request the BD Address and/or the Class of Device record of communication device 102. Using this information, the control circuit can determine if communication device 104 is compatible with communication device 102 with respect to engaging in an ad-hoc communication session, as described in detail above.

Upon determining that communication device 102 is compatible with communication device 104 with respect to ad-hoc communication, at step 226, the control circuit of communication device 104 notifies the user of the incoming request for ad-hoc communication. This notification can be provided in any number of ways, for example an audio tone or a visual prompt to a display screen. The user can then accept (or reject) the ad-hoc communication request by providing any number of inputs such as voice commands and/or button pressing. In an alternate arrangement, the user can configure the communication device 104 such that the device can accept and/or reject all incoming ad-hoc communication requests. In yet another arrangement, the user can configure communication device 104 such that the device can accept/reject requests coming from specific users in an automated or automatic fashion. By way of example, a user can configure his/her communication device 104 to automatically accept requests from one user, automatically reject requests from another user, and/or prompt the user when receiving a request from an unknown party.

Once the user has accepted the incoming ad-hoc communication request, at step 228, the pairing process between the two devices is completed, as described in detail above. At step 230 an audio channel is opened with communication device 102, and the ad-hoc communication session commences, as described in detail above. Finally, at step 232, upon disconnection of the communication session, the communication devices 102, 104 are disconnected from one another, and all connection and pairing parameters relating to the ad-hoc communication session are deleted from the respective communication devices 102, 104, as also described in detail above. As also noted above, in another arrangement, any/all of the connection and pairing parameters relating to the ad-hoc communication session are not deleted, and are maintained by one or both of the communication devices 102, 104 in order to facilitate future ad-hoc communication sessions.

It should be appreciated that several of the logical operations described herein are implemented (1) as a sequence of computer implemented acts or program modules running on communication device 104 and/or (2) as interconnected machine logic circuits or circuit modules within the communication device 104. The implementation is a matter of choice dependent on the performance and other requirements of the device. Accordingly, the logical operations described herein are referred to variously as operations, structural devices, acts, or modules. Various of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A first Bluetooth headset, comprising:
a processor,
a control circuit having a paired-communication module operatively connected to the processor to configure the processor so as to provide paired communications and an ad-hoc communication module operatively connected to the processor to configure the processor so as to pair with a second Bluetooth headset and establish and maintain an ad-hoc communication session with the second Bluetooth headset in response to an acceptance from the second Bluetooth headset to join the ad-hoc communication session;
a transmitter operatively connected to the control circuit for transmitting communication signals to the second Bluetooth headset in support of an ad-hoc communication session;
a receiver operatively connected to the control circuit for receiving communication signals from the second Bluetooth headset concerning the ad-hoc communication session;
a microphone operatively connected to the control circuit; and
a speaker operatively connected to the control circuit;
wherein the communication session acquires an open communication channel in support of the ad-hoc communication session.

2. The communication device of claim 1, further comprising memory, upon which the paired-communication module and ad-hoc communication module are stored.

3. A method for a first Bluetooth headset to provide an ad-hoc communication session with a second Bluetooth headset, the method comprising:
identifying the second Bluetooth headset within communication range of the first Bluetooth headset and which is not presently paired to the first Bluetooth headset;
requesting a communication channel through which the first Bluetooth headset and the second Bluetooth headset can communicate;
pairing the first Bluetooth headset and the second Bluetooth headset in response to the communication channel request;
requesting that the paired second Bluetooth headset join the ad-hoc communication session, wherein the requesting includes notifying the user of the paired second Bluetooth headset;
receiving an acceptance from the second Bluetooth headset to join the ad-hoc communication session;
upon receiving the acceptance, opening the communication channel for the ad-hoc communication session between the first Bluetooth headset and the second Bluetooth headset; and
upon termination of the ad-hoc communication session, disconnecting the first Bluetooth headset and the second Bluetooth headset.

4. The method of claim 3, further comprising:
inquiring for other Bluetooth headsets within range of the first Bluetooth headset.

5. The method of claim 3, further comprising:
detecting one or more Bluetooth headsets within range of the first Bluetooth headset.

6. The method of claim 3, wherein the identifying step includes requesting identification information from the second Bluetooth headset.

7. The method of claim 6, wherein the identifying step further includes comparing the identification information with a set of records to determine the compatibility of the second Bluetooth headset.

8. The method of claim 3, further comprising:
selecting a specific communication device for communication from among several available Bluetooth headsets.

9. The method of claim 3, wherein the communications channel is an audio channel.

10. The method of claim 3, further comprising:
commencing the ad-hoc communication session.

11. The method of claim 3, further comprising:
after the disconnecting step, deleting connection and pairing parameters relating to the ad-hoc communication session.

12. The method of claim 3, further comprising:
after the disconnecting step, maintaining the connection and pairing parameters relating to the ad-hoc communication session.

13. A method for participating in an ad-hoc communication session with at least one paired Bluetooth headset, the method comprising:
receiving at a second Bluetooth headset a communication signal from a first Bluetooth headset requesting that the paired second Bluetooth headset join an ad-hoc communication session with the first Bluetooth headset;
notifying a user of the communication signal;
receiving an acceptance from the paired second Bluetooth headset to join the ad-hoc communication session;
opening a communication channel for the ad-hoc communication session between the first Bluetooth headset and the second Bluetooth headset; and
upon termination of the ad-hoc communication session, disconnecting the first Bluetooth headset and the second Bluetooth headset.

14. The method of claim 13, further comprising:
initiating a discoverable mode at the second Bluetooth headset.

15. The method of claim 13, further comprising:
requesting identification information from the first Bluetooth headset.

16. The method of claim 15, further comprising:
determining the compatibility of the first Bluetooth headset based communication device base on identification information.

17. The method of claim 13, further comprising:
after the opening step, commencing the ad-hoc communication session.

* * * * *